(12) United States Patent
Egolf et al.

(10) Patent No.: US 6,260,809 B1
(45) Date of Patent: Jul. 17, 2001

(54) OVATE LOOP FOR ROTARY-WING BLADES

(75) Inventors: T. Alan Egolf, Glastonbury; Brian E. Wake, Portland, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/543,869

(22) Filed: Apr. 5, 2000

(51) Int. Cl.[7] ....................................................... B64C 3/00
(52) U.S. Cl. ........................... 244/198; 244/199; 244/39; 244/123; 244/17.11
(58) Field of Search .................................. 244/35 R, 199, 244/45 R, 34 R, 200, 198, 17.11, 39, 123

(56) References Cited

U.S. PATENT DOCUMENTS

| | | | |
|---|---|---|---|
| 994,968 | 6/1911 | Barbaudy | 244/35 R |
| 2,576,981 | 12/1951 | Vogt | 244/91 |
| 2,805,830 | 9/1957 | von Zborowski | 244/35 |
| 3,270,988 | 9/1966 | Cone, Jr. | 244/35 |
| 3,974,986 | 8/1976 | Johnstone | 244/40 R |
| 4,108,403 | 8/1978 | Finch | 244/199 |
| 4,975,022 * | 12/1990 | Perry | 244/17.11 |
| 5,102,068 | 4/1992 | Gratzer | 244/35 R |
| 5,137,427 | 8/1992 | Shenoy | 416/223 R |
| 5,297,764 * | 3/1994 | Haney | 244/199 |
| 5,785,282 | 7/1998 | Wake et al. | 244/199 |
| 6,171,056 * | 1/2001 | Lorber | 244/199 |

FOREIGN PATENT DOCUMENTS

| | | |
|---|---|---|
| 418656 | 12/1910 | (FR) . |
| 726674 | 6/1932 | (FR) . |

OTHER PUBLICATIONS

J. Schneider, "Can You Name It?" photograph, VERTI-FLITE, vol. 44, No. 2, Spring 1998, p. 51.
P. J. Fardink, response to "Can You Name It?" photograph query, VERTIFLITE, vol. 44, No. 3, Summer 1998, p. 6.

* cited by examiner

Primary Examiner—J. Woodrow Eldred

(57) ABSTRACT

Blade vortex interaction (BVI) noise, associated with the operation of aircraft having rotary-wing blades, is abated by the inclusion of an ovate loop tip (20) at the tip portion (16) of each of the rotary wing blades. The ovate loop tip (20) is substantially ovate in shape transverse to the direction of rotation of the rotary-wing blades (12). The ovate loop tip (20) includes upper and lower halves (20',20") of similar or substantially identical geometry, and is positioned substantially symmetrically with respect to a plane (24) defined substantially by the chord of the rotary-wing blade at or near the tip portion (16). The upper and lower halves (20',20") of the ovate loop tip (20) have a common origin or root at their point of attachment with the blade tip portion (16). This geometry and positioning of the ovate loop tip (20) reduces the intensity of the resulting tip vortex, while also minimizing additional loads and stresses on the blade.

9 Claims, 3 Drawing Sheets

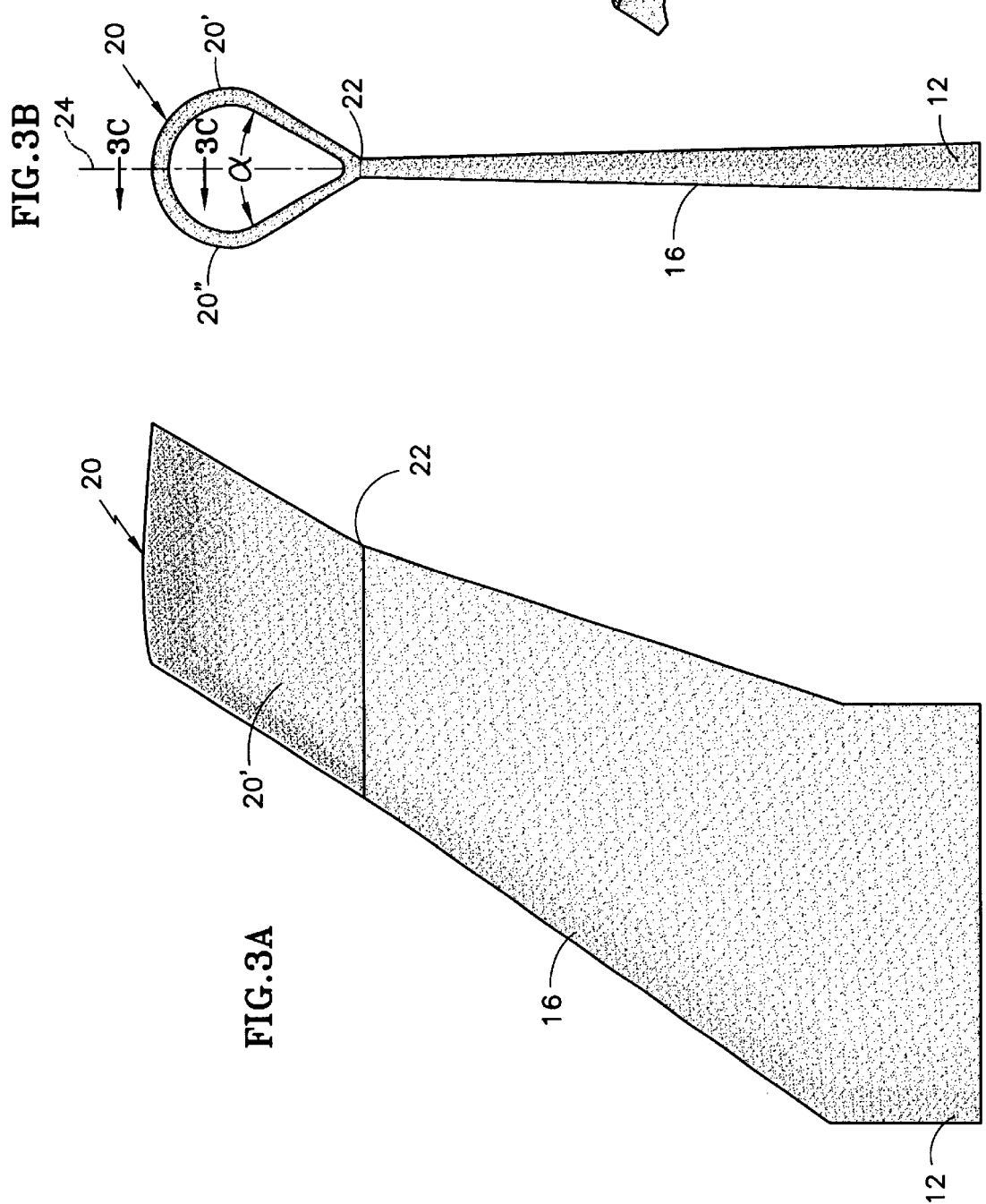

OVATE LOOP FOR ROTARY-WING BLADES

TECHNICAL FIELD

This invention relates to wings, and more particularly to rotary-wing blade tips for aircraft. More particularly still, the invention relates to an improved rotary-wing blade tip for noise reduction.

BACKGROUND ART

It is well known that the vortex formed at the tip of aircraft wings and blades moving relatively through the air may give rise to some undesirable resulting effects. One such effect is the resultant increase in drag on the wing caused by the tip vortex. Particular attention has been paid to this effect with respect to the wing surfaces of fixed-wing aircraft, and numerous wing tip designs have been proposed or used to minimize that vortex-induced drag penalty in such aircraft. One such design is described in U.S. Pat. No. 5,102,068 (hereinafter '068) to Gratzer for Spiroid-Tipped Wing.

In that '068 patent, a spiroidal tip device of particular geometry and orientation, depicted in Prior Art FIGS. 1A–1C, is used principally to reduce induced drag. A typical wing end portion 1 has a spiroid 2 attached thereto. The spiroid 2 joins the wing at a sweep angle Δ, measured relative to the wing tip chord line 4 and included angle φ, measured relative to the projected wing plane 3. The subscripts F and A are used to designate the forward and aft ends respectively. The spiroid surface cross sections are typical airfoil sections 5, shown inset in FIG. 1A. The spiroid chord, which is a function of distance along a spiroidal generator 6, decreases approximately linearly from slightly more than half the wing tip chord at its forward end to about 0.3 of the wing tip chord at the spiroid midpoint; thereafter it increases approximately linearly to about half the wing tip chord at its aft end.

Another undesirable effect of such tip vortices is the noise, typically audible, created when the vortex interacts with an object, such as another trailing blade or the body and empennage structures of an aircraft. This phenomenon is known as blade vortex interaction, or simply, "BVI". The resulting noise may be particularly objectionable with respect to the operation of rotorcraft, such as helicopters, tilt-rotors, and other rotary-wing aircraft, especially during low speed descent to landing and maneuvers. It is this latter effect (i.e.,BVI) that is to be addressed by the present invention.

While the aforementioned '068 Patent also suggests applicability of its spiroid-tipped wing to reduce noise and that it may be used with helicopters, its geometry and orientation are relatively complex and not well suited for use under the high centrifugal loadings imposed by rotary-wing aircraft. Indeed, the spiroid-tipped wing of that patent discloses only an arrangement that is highly asymmetrical to the loadings normally occasioned at the tip of a rotary-wing blade, as noted by the placement of spiroid 2 entirely above the extended plane 3 of wing 1. Moreover, its geometry is sufficiently varied over the extent of the spiroid as to make it difficult to manufacture.

It is thus an object of the present invention to provide an improved rotary-wing blade tip that reduces blade-tip vortex energy intensity to thereby reduce noise resulting from subsequent vortex interactions. It is a further object of the invention to provide such an improved rotary-wing blade tip in a manner that minimizes additional loading and stresses on the rotary-wing blade during operation.

DISCLOSURE OF INVENTION

The present invention is for an improved aircraft rotor having a plurality of rotary-wing blades for rotation in a direction about a common rotor axis. Each of the rotary-wing blades includes a tip portion radially outward from the rotor axis, which tip portion is improved by the inclusion of an ovate loop tip at its radially outer end. Each ovate loop tip has an ovate geometry transverse to the direction of blade rotation and is substantially symmetric with respect to a plane defined substantially by the chord of the tip portion of the rotary-wing blade. The ovate loop tip structure reduces substantially the intensity of blade tip vortices, thereby also reducing the noise otherwise produced by blade vortex interference. Moreover, the geometry and positioning of the ovate loop tip minimize additional loading of the respective rotary-wing blades.

The loop forming the ovate loop tip comprises upper and lower halves that are substantially coextensive and coincident with each other in the direction of rotor rotation. Each of the loop halves has a root portion, and the respective root portions of the upper and lower halves are attached to the rotary-wing tip portion. The upper and lower halves of the ovate loop diverge at an angle α from their attachment at their respective roots with the rotary-wing tip portion, that angle α being less than 90°, typically in the range of 35° to 65°.

The leading edge of each ovate loop tip is substantially a linear continuum of the leading edge of the rotary-wing tip portion adjacent thereto, both of which may be rearwardly swept relative to the direction of rotor rotation. The ovate loop tip has a geometry in the form of airfoil sections, with fore to aft thickness in the chordal direction. In the illustrated embodiment, the thickness is substantially constant over the entire upper and lower halves of the ovate loop tip, however variations may occur as required to satisfy the objects of the invention. The ovate loop tip also is provided with twist, which may be constant or may vary around the loop commensurate with good design practice.

The foregoing features and advantages of the present invention will become more apparent in light of the following detailed description of exemplary embodiments thereof as illustrated in the accompanying drawings.

BRIEF DESCRIPTION OF THE DRAWINGS

FIG. 3A is a plan view of the tip portion of a rotary-wing blade with tip sweep, showing the ovate loop tip of the invention attached at the blade tip;

FIG. 3B is a front view, looking aft, of the rotary-wing blade with ovate loop tip of FIG. 3A;

FIG. 3C is an airfoil section of the ovate loop tip of FIG. 3B, taken along line 3C—3C thereof.

BEST MODE FOR CARRYING OUT THE INVENTION

Figure 1A:
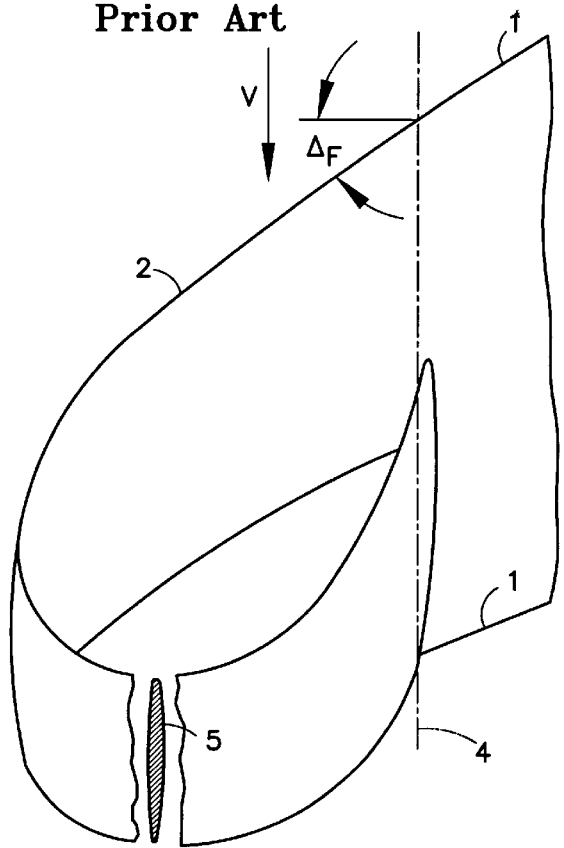
FIGS. 1A, 1B, and 1C are, respectively, a plan view, a rear view, and a left-hand side view of a spiroid-tipped wing in accordance with the Prior Art.
Figure 1C:
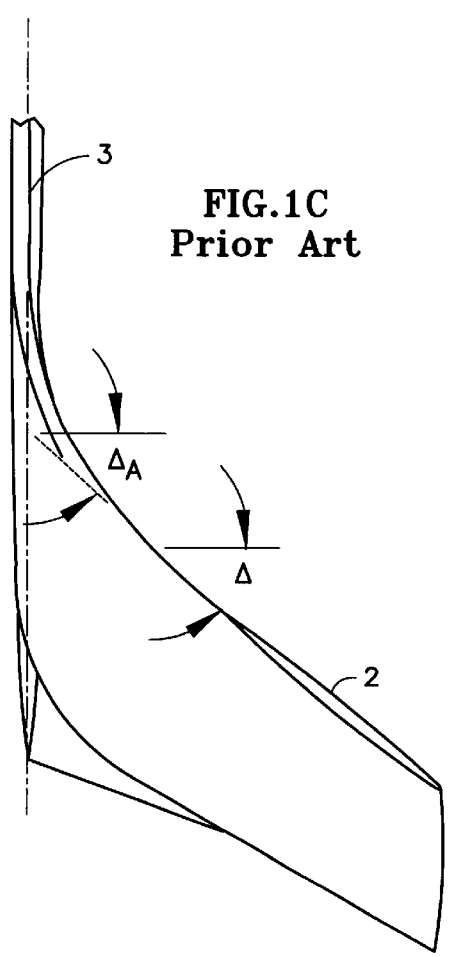
Figure 1B:
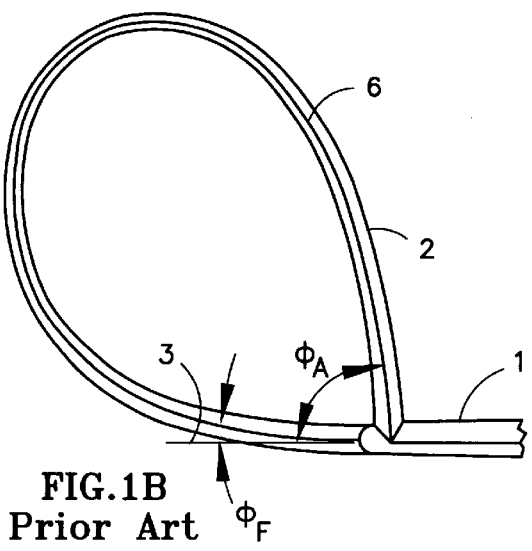

Referring briefly to FIGS. 1A–1C, there is depicted a wing end portion 1 with a spiroid 2 attached thereto, as described previously with respect to the '068 patent in the Background Art section. It will be noticed that the wing-tip spiroid of that patent varies its chord length as a function of the length of the spiroid, as well as varying the twist of that airfoil. Moreover, the spiroid is asymmetrically positioned relative to the projected wing plane 3, with substantially the entire spiroid 2 being positioned above that plane. While professing to reduce vortex roll-up and thus reduce drag on the wing, the spiroid of that patent is seen to have a complex shape and orientation, and is not well suited for use in reducing BVI noise in rotary-wing aircraft.

Figure 2:
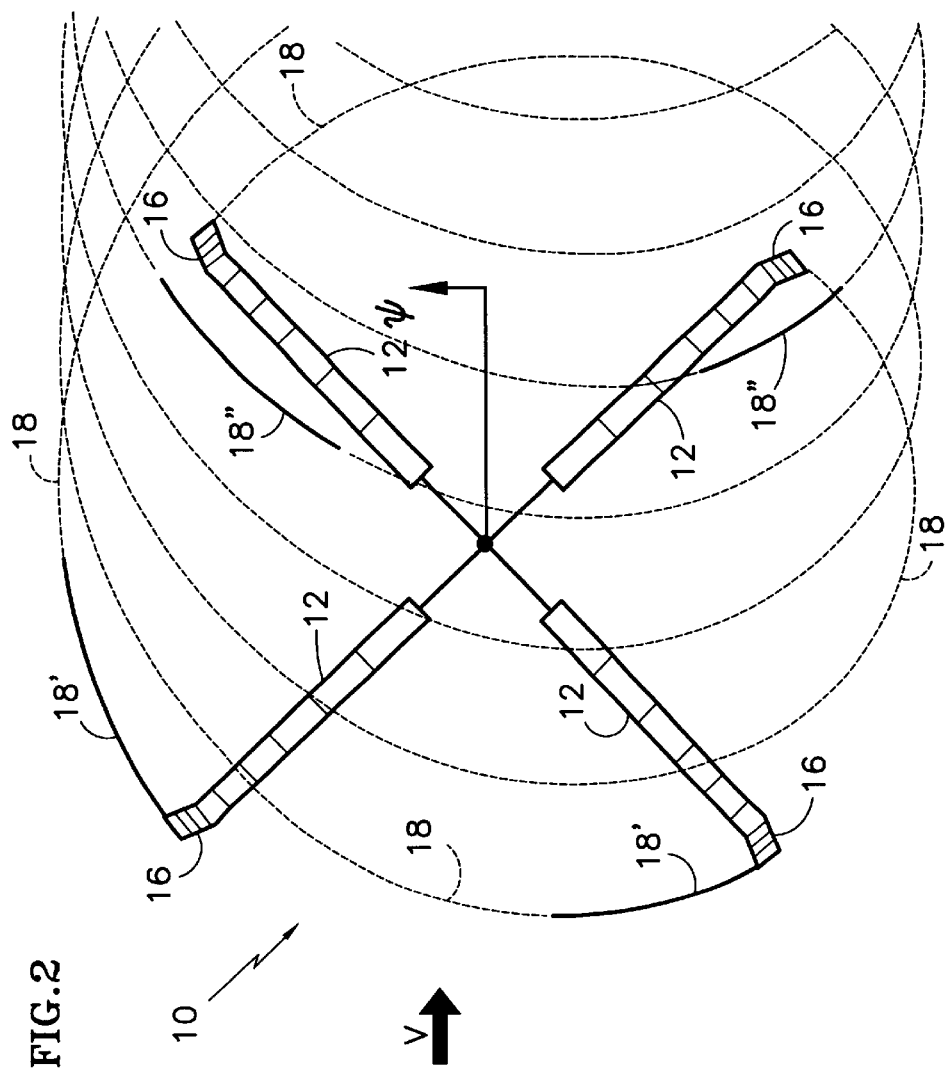
FIG. 2 is a diagrammatic plan view of an aircraft rotor having 4 rotary-wing blades, and showing blade vortex generation and interaction.

Referring now to FIG. 2, there is depicted a plan-view diagram of the rotor 10 of a multi-blade, rotary-wing aircraft, as for instance, a helicopter. The rotor 10 includes four rotary-wing blades 12 connected for counterclockwise rotation about the rotor axis 14. The radially outward portions of blades 12 are termed the tip portions 16, and include the end tips of the blades 12 being illustrated as swept in this embodiment, though it is not essential to the invention. It is at the outer ends of these tip portions 16 that the disruptive vortices are formed. These tip vortices are represented by the solid/broken lines 18 trailing from the tips of the respective blades 12.

More specifically, the diagram of FIG. 2 depicts the aircraft (not shown) and its rotor 10 moving from right to left, and the relative wind velocity vector V is depicted as being directed from left to right. The reference for blade azimuth angle ψ is presumed to be the longitudinal centerline of the aircraft, extending aft from the rotor axis 14. The lines 18 represent a kinematic prediction of the paths taken by the vortices shed by the rotor 10 at an advance ratio of 0.2. The solid line portions 18' of vortices 18 represent the generation of those vortices at the tip portions 16 of the blades 12, both for advancing side blades and for retreating side blades. Similarly, the solid line portions 18" of vortices 18 represent vortex interactions with subsequent advancing and retreating side blades, which then result in noise.

Referring now to FIGS. 3A–3C, the present invention reduces the intensity of the vortices generated at the blade tip portions 16 of blades 12 by the inclusion, or addition, of an ovate loop tip 20 at each of those tip portions. FIG. 3A depicts an ovate loop tip 20 affixed to the radially outer end of a blade 12 having a tip portion 16 of large swept tapered design. In the illustration of FIG. 3A, the blade 12 is advancing from right to left, as in the $1^{st}$ or $2^{nd}$ quadrants of rotation of the rotor 10. The ovate loop tip 20, or simply OLT 20, is formed as a continuous loop having upper and lower halves 20' and 20" respectively, seen in FIG. 3B, joined at a common root chord 22 to the outer end of blade tip portion 16. The OLT 20, as viewed in the front view of FIG. 3B in the direction of relative blade to air motion, has an ovate cross-sectional shape. This shape has been found to significantly reduce the intensity of the vortex created at the tip region of the rotary-wing blades 12.

In important contrast with the spiroid 2 of prior art FIG. 1, the OLT 20 of the present invention is substantially symmetrical with respect to a plane 24 which is defined substantially by the locus of the chord of blade 12 in its tip portion 16, which plane is also nominally the plane of the blade in that region. The upper and lower halves 20' and 20" of the OLT 20 diverge at an interior angle α from their attachment to the blade tip portion 16 at their common root chord 22. That angle α is less than 90°, typically being in the range of about 35° to 65°, with two specific exemplary embodiments having been 60° and 45°. The radially outer portion of the OLT 20 comprises the arc of a circle having its center on the plane 24 and being of such diameter and length as to smoothly transition with the root-end portion at angle α. In each such instance, the OLT 20 is substantially symmetrical about the chordal plane 24 of tip portion 16. This geometry minimizes out-of plane loading and stresses on the blade 12, and effectively reduces the energy and intensity of any resulting tip vortex.

Figure 4:
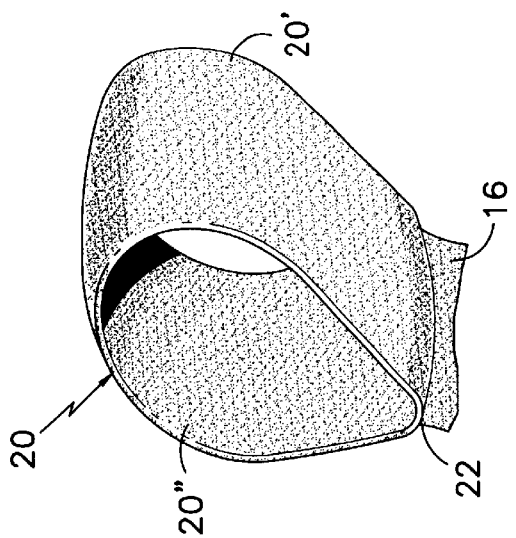
FIG. 4 is a perspective view of the rotary-wing ovate loop tip of the invention.

Viewing the OLT 20 of FIGS. 3A–3C in further detail, it will be noted that the upper and lower halves 20' and 20" of the OLT 20 are coincident with each other in the direction of rotor rotation. As seen in planform in FIG. 3A and in perspective view in FIG. 4, the fore to aft positioning of the OLT upper half 20' is coincident with that of the OLT lower half 20". Moreover, in the illustrated embodiment, the fore to aft length of the chord of the OLT 20 is substantially constant for the entire spanwise extent of the OLT, that length being substantially the same as the length of its root chord 22. However, this chord length parameter may vary along the loop to the extent required by good aeronautical design practice.

It is also desirable that at least the leading edge of the OLT 20 forms a substantially linear continuum with the leading edge of the tip portion 16 to which it is attached. Thus, it is seen that both the tip portion 16 and the OLT 20 have a leading edge that is swept back from the leading edge of blade 12 at the same angle, in the illustrated example 33.5°. Although the blade 12 and OLT 20 are depicted in this embodiment as having a swept back leading edge, such geometry is not required to practice the invention. Because in the illustrated example the tip portion 12 is tapered but the OLT 20 has a constant chord length, it will be noted that the trailing edge of the OLT 20 may be at a different angle than the trailing edge of the tip portion 12, however this difference is minor and of no significant adverse consequence. In fact, the OLT 20 could be tapered.

FIG. 3c depicts an airfoil section of the OLT 20, and is a NACA 0007 airfoil section. Because the geometry of the exemplary embodiment of the invention is relatively constant for the entirety of the OLT 20, the depicted airfoil section is generally representative of an airfoil section anywhere along either of the upper and lower halves 20' and 20" of the OLT. However, it will be appreciated that the range of good aerodynamic design practice does allow for variation in at least the chordal length of OLT 20 along its upper and lower halves 20' and 20", in which case the airfoil section may vary accordingly. Further, some limited variation in the twist of the OLT 20 over its upper loop half 20' and lower loop half 20" may be appropriate for design optimization, in which case the airfoil section may vary somewhat in shape and orientation as a function of its position on the OLT 20. In each instance within the range of permissible design variation, the resulting vortex shed from this tip region of the blade 12 is substantially more diffused and has a larger core diameter than would otherwise be the case without the OLT 20.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. An aircraft rotor (10) having a plurality of rotary-wing blades (12) for rotation in a direction about a common rotor axis (14), each rotary-wing blade (12) including a tip portion (16) radially outward from the rotor axis (14), the improvement wherein the tip portion (16) of each of said rotary-wing blades (12) further includes a respective ovate loop tip (20), each ovate loop tip (20) being at the radially outermost portion of the rotary-wing blade (12) and having an ovate geometry transverse to the direction of blade rotation and being substantially symmetric with respect to a plane defined substantially by the chord of the tip portion (16) of the rotary-wing blade (12), thereby to reduce the intensity of blade tip vortices.

2. The rotor (10) of claim 1 wherein the loop forming the ovate loop tip (20) of each rotary-wing blade (12) comprises upper and lower halves (20',20") each having a respective root portion, and the respective root portions of the upper and lower loop halves (20',20") being coincident and attached to the rotary-wing tip portion (16) at a common root chord (22).

3. The rotor (10) of claim 1 wherein the leading edge of the tip portion (16) of each rotary-wing blade (12) is rearwardly swept at a particular angle relative to the direction of rotor rotation and the leading edge of the respective ovate loop tip (20) is rearwardly swept at substantially said particular angle to maintain a substantially linear continuum to the blade tip portion (16).

4. The rotor (10) of claim 2 wherein the upper and lower halves (20',20") of the ovate loop diverge at a particular interior angle a from their attachment at the root chord (22) with the rotary-wing tip portion (16), said angle $\alpha$ being less than about 90°.

5. The rotor (10) of claim 4 wherein said interior angle $\alpha$ is in the range of 35° to 65°.

6. The rotor (10) of claim 5 wherein said interior angle $\alpha$ is in the range of 45° to 60°.

7. The rotor (10) of claim 2 wherein each said ovate loop tip (20) has a geometry in the form of airfoil cross sections with thickness in the chordal direction and with twist, and wherein the thickness and the twist over the upper and lower halves (20',20") of the ovate loop tip (20) are selected to maximize reduction of blade tip vortices at selected flight conditions.

8. The rotor (10) of claim 7 wherein the upper and lower halves (20',20") of the ovate loop tip (20) are substantially coincident with each other in the direction of rotor rotation.

9. The rotor (10) of claim 2 wherein the upper and lower halves (20',20") of the ovate loop tip (20) are of substantially constant chordal length and are substantially coincident with each other in the direction of rotor rotation.

* * * * *